United States Patent [19]

Grieve

[11] 3,809,187
[45] May 7, 1974

[54] BRAKE ASSEMBLY FOR VEHICLE WHEEL
[76] Inventor: Richard A. Grieve, 1610 S. 2nd St., Marshalltown, Iowa 50158
[22] Filed: Oct. 20, 1972
[21] Appl. No.: 299,231

[52] U.S. Cl. ............................................. 188/24
[51] Int. Cl. ............................................. B62l 1/14
[58] Field of Search ........................ 188/24, 72.2

[56] References Cited
UNITED STATES PATENTS
3,114,434 12/1963 Pletscher .................................. 188/24
2,663,384 12/1953 Chamberlain ........................ 188/72.2

FOREIGN PATENTS OR APPLICATIONS
1,093,809 12/1967 Great Britain ........................ 188/24
784,385 10/1957 Great Britain ........................ 188/24
7,885 2/1900 Great Britain ........................ 188/24

Primary Examiner—Albert J. Makay
Assistant Examiner—Donald W. Underwood

[57] ABSTRACT

A brake assembly for a bicycle is disclosed which includes a yoke adapted to be mounted on a bicycle adjacent the rim of the wheel, a pair of arms pivotably connected to the yoke on opposite sides of the rim for swinging movement of a brake pad on the end of each arm toward and away from the vehicle rim and a manually actuable cable for pulling the arms toward one another and the wheel rim. The friction of the rim against the brake pads exerts a moment force on the arms which either increases or decreases the force of the pads against the rim depending on the direction of rotation of the wheel. A bicycle which has at least one such brake assembly mounted thereon is also disclosed.

11 Claims, 6 Drawing Figures

BRAKE ASSEMBLY FOR VEHICLE WHEEL

BACKGROUND OF THE INVENTION

1. Field of the Invention

This invention relates to a brake assembly for a vehicle wheel and in particular to a brake assembly adapted to be mounted adjacent the rim of a bicycle wheel so that it can be either self-energizing or self-de-energizing depending on the relationship of the brake arms to the direction of rotation of the wheel.

2. Description of the Prior Art

It is knwon to provide brake assemblies which include a disc and pivotable arms or the like with brake pads thereon wherein the friction between the brake pads and disc creates a self-energizing force which increases the pressure of the brake pads against the disc and therefore increases the braking effect on the disc. It is also known to provide brake assemblies for bicycles or the like which include pivotable arms with brake pads thereon which are movable against the rim of a wheel on the bicycle. The pivot arms of most such bicycle brakes have typically extended substantially radially of the bicycle wheel and have relied entirely on the manual force which the rider applies to the actuating mechanism for forcing the brake pads against the rim of the wheel. Such brakes have therefore frequently required substantial strength to apply sufficient braking force to stop a bicycle quickly, and have sometimes been unsafe, particularly when the rider is a child or woman.

The prior art is lacking in a brake assembly for a wheel on a bicycle or other similar vehicle in which the assembly is self-energizing to minimize the force that must be applied manually in order to slow or stop the bicycle. The prior art is also lacking in a brake assembly for a bicycle wheel which can be self-de-energizing to avoid the application of too much braking force on the front wheel of the bicycle which could cause the rider to lose control of the bicycle and which could throw him over the handle bars.

SUMMARY OF THE INVENTION

This invention provides a brake assembly adapted to be mounted on a vehicle, such as a bicycle, adjacent the rim of a wheel on the vehicle, including a yoke with a pair of arms pivotably connected thereto on opposite sides of a rim of a wheel at locations spaced from the opposite faces of the rim and having a brake pad on each arm distal its pivotable mounting, and means for actuating the arms to swing the brake pads against the rim in a plane which is substantially perpendicular to a diametrical line across the wheel through the brake pads. A bicycle with at least one such brake assembly mounted thereon is also provided.

Accordingly, an object of the invention is to provide a brake assembly that can be either self-energizing or self-de-energizing depending on the direction of rotation of a wheel with respect to the brake arms in the assembly.

Another object of the invention is to provide a brake assembly which can be mounted on a wide tired bicycle without adversely affecting the manual force required to slow or stop the bicycle.

A further object of the invention is to provide a caliper brake for a bicycle which is safer than heretofore known caliper brakes.

Another object of the invention is to provide a caliper brake in which the brake pads on the arms of the caliper are swingable in a plane which is substantially perpendicular to a dimetrical line across the wheel, and the brake arms are angled from their pivots which are spaced from the wheel rim inwardly toward the rim to brake pads whereby the brakes are either self-energizing or self-de-energizing depending on the direction of rotation of the wheel.

Another object of the invention is to provide a safer bicycle braking system which is self-modulating to automatically produce more braking force on the rear wheel than is produced on the front wheel for the same manual actuating force applied to both brakes.

The above and other objects and advantages will be more fully understood and appreciated with reference to the following description and the drawings attached hereto.

DESCRIPTION OF A PREFERRED EMBODIMENT

Figure 1:
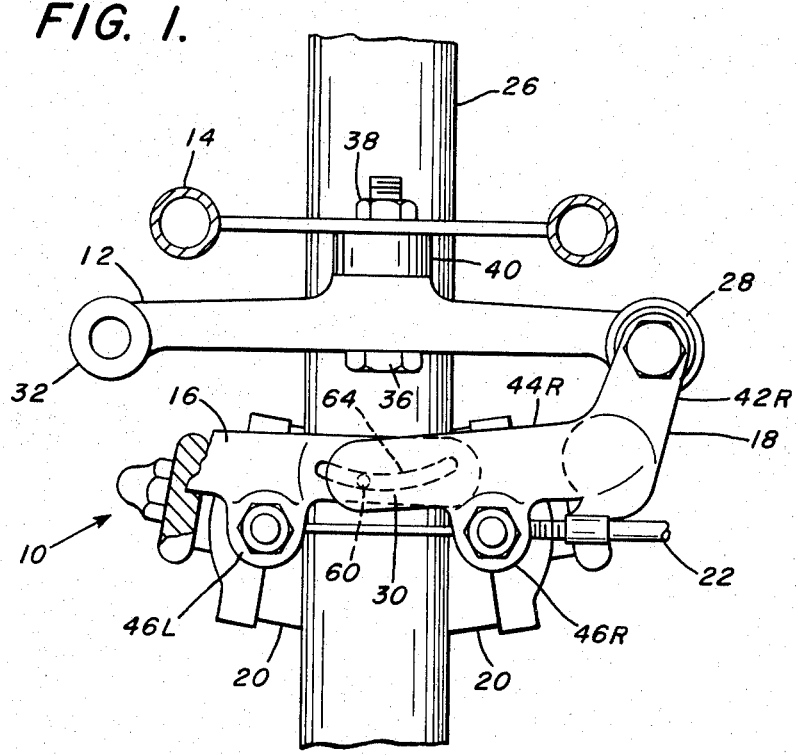
FIG. 1 is a top plan view of a brake assembly of the invention.

Referring to FIGS. 1–5, a preferred embodiment of a brake assembly 10 of the invention is illustrated as comprising a yoke 12 adapted to be secured to a bicycle frame 14, a pair of actuating arms 16 and 18 pivotably mounted on yoke 12, a brake pad 20 secured on each actuating arm, an actuating mechanism 22 for pivoting arms 16 and 18 to move brake pads 20 against a rim 24 on bicycle wheel 26, torsion springs 28 for releasing the brake, and a cam means 30 for synchronizing the movement of the actuating arms. Yoke 12 may be made of cast metal such as mild steel, aluminum or the like, and may include two integral spaced cylinders 32 and 34 with a smooth bore to receive a pivot pin or bushings, or with threaded holes therein for receiving bolts or the like which secure arms 16, 18 to the yoke. In the embodiment selected for illustration, cylinders 32 and 34 are parallel and vertically oriented, but it will be apparent that the cylinders could also be angled inwardly from top to bottom or have other slightly different orientations without departing from this invention. It is noted that the left hand side of brake assembly 10 is shown in incomplete form on the left hand side of FIGS. 1 and 2 in order to show cylinder 32 of yoke 12. A bolt 36, spacer 40 and nut 38 may be employed for rigidly securing yoke 12 to the bicycle frame adjacent the wheel rim 24.

Actuating arms 16 and 18 of brake assembly 10 may be made of cast or forged metal such as aluminum or an alloy thereof and are substantially mirror images of each other except for a few small differences as will be explained. For purposes of the description, the same number will be used for the matching parts of each arm except that the part numbers for arm 16 on the left hand side of brake assembly 10 was viewed in FIGS. 1 and 2 will be followed by an L, and the part number for arm 18 on the right hand side of the assembly will be followed by an R.

Figure 3:
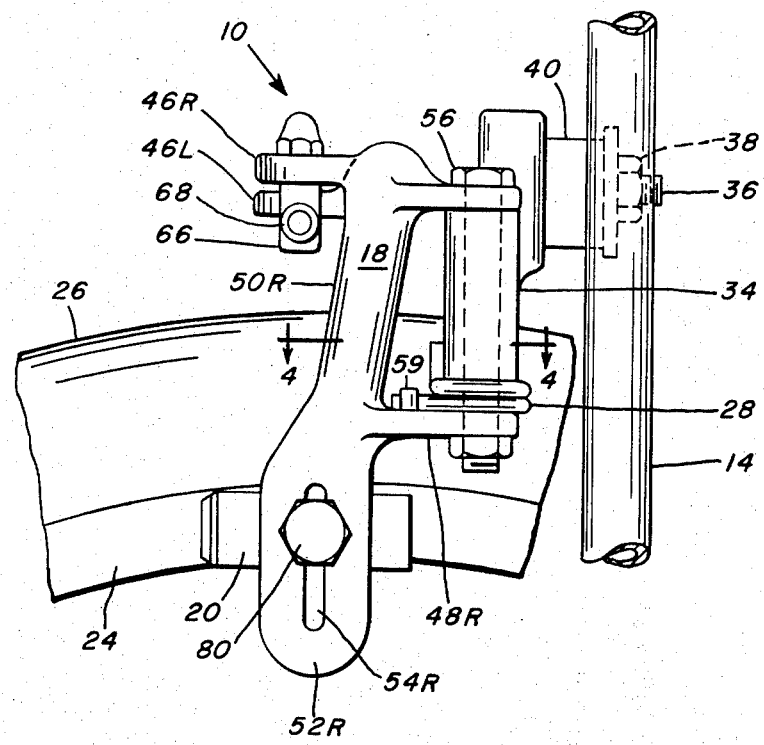
FIG. 3 is a side elevation view of the brake assembly of FIGS. 1 and 2.
Figure 4:
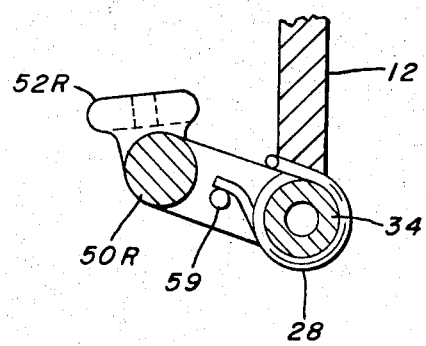
FIG. 4 is a cross-sectional view taken along line 4—4 of FIG. 3.

Arm 18 on the right hand side of brake assembly 10 includes an upper portion comprising a finger 42R for mounting arm on yoke 12, a finger 44R for synchronizing the movement of the arm, and a finger 46R for attachment of an actuating mechanism. Arm 18 further includes a lower finger 48R for mounting the arm on yoke 12, a vertical leg 50R rigidly connecting the upper portion to the lower finger, and a depending ear 52R with a slot 54R in it for attachment of an adjustable brake pad 20 to the arm. Upper finger 42R and lower finger 48R have holes through their outer ends for receiving bolts 56 and nuts 58 which pivotably connect arm 18 to yoke 12 as is best seen in FIG. 3. Lower finger 48R also has an upwardly projecting pin 59 on it to be engaged by one end of torsion spring 28 as is illustrated in FIG. 4. Torsion spring 28 is mounted around the bottom end of cylindrical portion 34 of yoke 12 with the spring tightly coiled, and one end of the spring hooked against the yoke 12 and the other end hooked against pin 59 so that the spring acts on actuating arm 18 to rotate it counterclockwise around its axis of rotation as viewed in FIG. 4. This moves brake pad 20 away from wheel rim 24 after the manual actuating mechanism has been released so that the brakes are released.

Finger 44R on arm 18 has a small vertical cylindrical protuberance or cam peg 60 which fits in an arcuate slot 64 in finger 44L on left hand arm 16 for synchronizing movement of arms 16 and 18. Cam peg 60 is permanently attached to finger 44R on arm 18 but can slide in arcuate slot 64 in arm 16 whereby any pivotable movement of either arm toward or away from the bicycle wheel 26 will result in like movement of the other arm.

Figure 2:
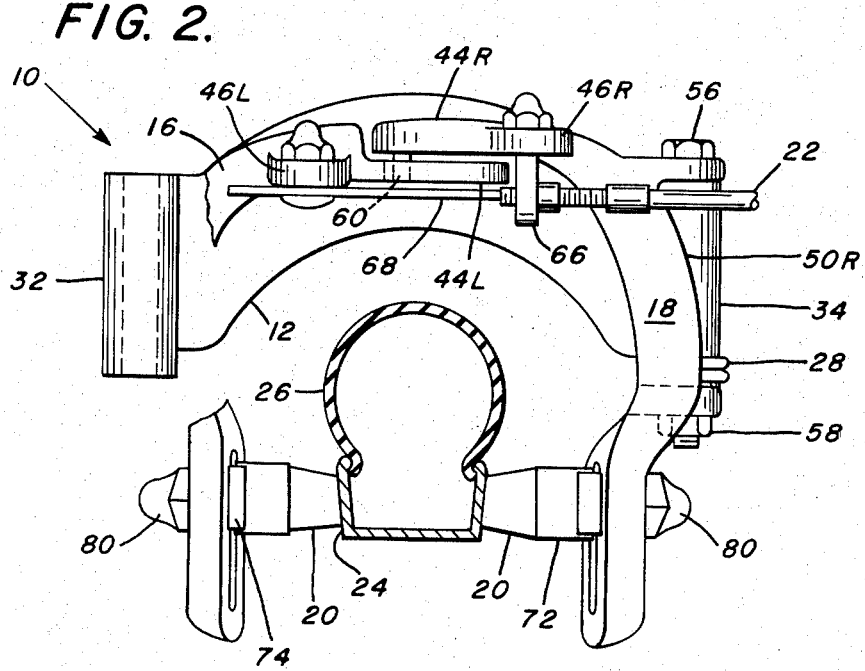
FIG. 2 is a partial front elevation view of the brake assembly of FIG. 1.

Finger 46R on arm 18 may have a hole in it for receiving the end of a lug 66 to which an actuating cable 68 is attached. Cable 68 is also attached to finger 46L on arm 16 so that actuation of the cable will operate arms 16 and 18. As is best illustrated in FIG. 2, the upper portion of actuating arm 16 on the left hand side of brake assembly 10 differs from the upper portion of arm 18 on the right hand side in that finger 46L is preferably offset downward so that its undersurface is substantially coplanar with cable 68 for connection thereto. As attached to finger 46L and R on actuating arms 16 and 18, cable 68 extends across the arms and is adapted to pull the arms toward one another to move brake pads 20 against the rim of a bicycle wheel. As is also illustrated in FIG. 2, finger 44L on arm 16 is also offset downwardly beneath the matching finger 44R on arm 18 so that the upper surface of finger 44L underlies the undersurface of finger 44R for sliding movement between the fingers when the actuating mechanism operated.

Figure 5:
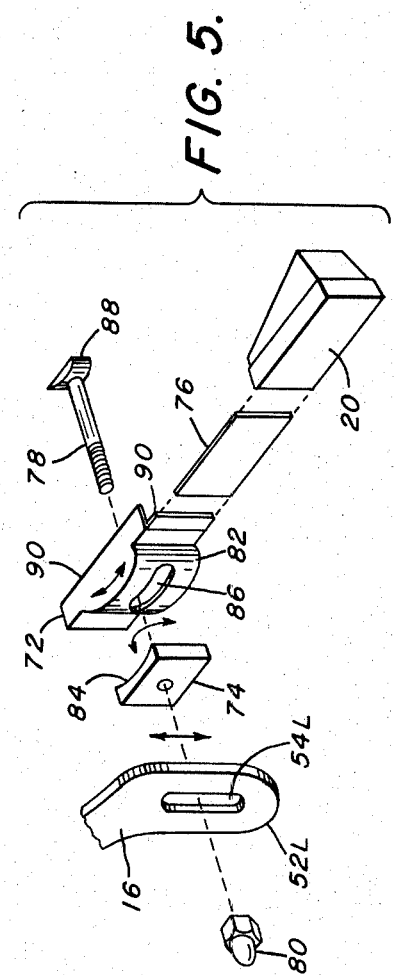
FIG. 5 is an exploded view of swivel adjusting mechanism adapted for connecting a brake pad to a brake assembly of the invention.

FIG. 5 illustrates preferred means for attachment of a wedge-shaped brake pad 20 to ear 52L on arm 16 of brake assembly 10 whereby the pad can be adjusted in several different ways. A similar attachment means is also used for attachment of a brake pad 20 on ear 52R on arm 18. Brake pad 20 is preferably wedge-shaped to provide greater pad thickness at the location of greatest wear, but may also be of conventional rectangular shape as will be apparent to those skilled in the art.

The attachment means includes a swivel pad clip 72, a washer 74, a backing plate 76, a bolt 78 and a nut 80. Clip 72 has a cylindrical surface 82 for engagement against a mating concave surface 84 in washer 74, and has a slot 86 across the cylindrical surface. The opposite face, not shown, of clip 72 may also have a concave recess in it for seating a curved bead 88 of bolt 78 in the clip so that the bolt head can have clearance for adjustment purposes. Clip 72 further has peripheral flanges 90 projecting away from its cylindrical surface 82 on perferably all four edges of the clip. Flanges 90 are adapted to be crimped against pad 20 and into a small groove around the periphery of the pad to secure the pad to the clip with bolt 78 already inserted through the clip. Backing plate 72 is positioned between pad 20 and clip 72 to provide support for the pad to prevent it from being forced into the recess in the face of the clip when the pad is compressed under braking loads. The assembly of clip 72, plate 76, bolt 78 and pad 20 can be mounted on ear 52L on arm 16 by inserting the bolt through washer 74 and slot 54L in ear 52L, and threading nut 80 on the bolt. As secured, brake pad 20 is preferably restrained so that it cannot move with respect to ear 52L.

It is a feature of the means which has been selected for illustration for attaching brake pads 20 to brake assembly 10 that the pad can be adjusted with respect to the rim of a wheel to insure proper interfacial contact between the rim and the brake pad upon contact to thereby insure maximum braking efficiency. Such adjustments include adjustment of the vertical position of pad 20 in slot 54L, adjustment of the angle of the pad with respect to the longitudinal axis of bolt 78, and adjustment of the orientation of the pad in its vertical plane. To make such adjustments, nut 80 is loosened, and pad 20 can be swiveled by rotating clip 72 with respect to washer 74 and can be rotated or turned on the axis of bolt 78 in the vertical plane of the pad as is indicated by the arrows on FIG. 5. Nut 80 is tightened after pad 20 has been adjusted to hold the pad in correct position.

As assembled and mounted on a bicycle frame, arms 16 and 18 are pivotable with respect to yoke 12 and with respect to the bicycle rim for swinging movement of brake pad 20 in a plane which is substantially perpendicular to a diametrical line drawn across the bicycle wheel through the brake pads. As will be explained such pivotable movement of the brake pads with respect to a wheel rim facilitates self-energization of the brake assembly to either increase or decrease the force of the brake pads against the rim. It will be apparent to those skilled in the art that the plane in which the brake pads are moved may depart from a right angle to such diametrical line, but it is preferably relatively close to a right angle for optimum functioning of the brake assembly.

Arms 16 and 18 are operable through cable 68 which is connected to a hand lever on the handle bars of a bicycle to swing the arms and brake pads 20 thereon inwardly against rim 24 of wheel 26. When the brake pads are pressed against the wheel rim and the wheel is turning, friction between the pads and the rim slows or stops the rotation of the wheel and the travel of the bicycle. When the hand lever is released, coil springs 28 in brake assembly 10 act to swing arms 16, 18 and brake pads 20 thereon outwardly away from wheel rim 24 to release the braking effect between the pads and the rim.

Brake assembly 10 of this invention is particularly well suited for mounting on a bicycle having relatively large tires which necessitate securing the assembly to the bicycle frame relatively far from the rim of the bicycle wheel. Yoke 12 straddles the wheel with arms 16 and 18 on opposite sides of the wheel. The pivot axes of arms 16 and 18 are substantially parallel to the wheel on opposite sides of the wheel so that the vertical length of the actuating arms has no effect upon either the mechanical advantage or the self-energizing effects of the brake assembly. A brake assembly of this invention therefore eliminates loss of mechanical advantage for wide tired bicycles.

It is a feature of this invention that brake assembly 10 can be either self-energizing or self-de-energizing depending on the direction of rotation of wheel 26 with respect to actuating arms in the assembly. Heretofore known caliper brakes for bicycles have typically relied entirely on the manual force which has been applied to the actuating mechanism to force the brake pads against the rim of the bicycle wheel. The levers in such caliper brakes have usually extended substantially radially from the wheel rim and have clamped the rim as would the jaws of a pair of pliers. Consequently, in such brakes the direction of the frictional forces between the brake pads and the rim has been across or substantially normal to the longitudinal axes of the arms of the calipers and have not affected the gripping force of the caliper, either to increase or decrease the braking forces.

According to this invention the arms of a caliper are so disposed that the line of the frictional forces between the brake pads and the wheel rim creates a moment on the arms of the caliper which tends to rotate the arms about their pivots. When such frictional force rotates the arms in the same direction as the manual actuating force which is exerted on the arms, there is a summation of forces which increases the force of the brake pads against the rim. Such increase in the force of the brake pads against the wheel rim makes the brake assembly self-energizing so that a minimum of manual force is required of the rider.

A brake assembly of the invention can also be self-de-energizing when the frictional force between the brake pads and the rim rotates the actuating arms against the direction of the manual force which is being applied to the arms. As will be expalined, the relationship of the actuating arms of a brake assembly to the usual direction of rotation of the wheels when the bicycle is moving determines whether the brake assembly is self-energizing or self-de-energizing.

FIG. 1 is used to illustrate that a brake assembly 10 of the invention can be either self-energizing or self-de-energizing depending on the direction of rotation of wheel of a bicycle with respect to the actuating arms. Brake assembly 10 is self-energizing when wheel 26 is moving toward the top of the figure because the frictional force between brake pads and rim then pivots the brake pads toward the rim to increase the braking force therebetween. Conversely, when wheel 26 adjacent the brake is moving toward the bottom of the figure the frictional force between brake pad 20 and rim 24 will rotate brake arms 16 and 18 and brake pads 20 away from the rim to decrease the force of the pad against the rim and thereby decrease the braking effect.

The increase or decrease in the braking force of a self-energizing brake is a function of several factors including the coefficient of friction of the brake pads against the wheel rim, the perpendicular distance between the wheel rim and the pivot for the brake arms, and the distance between the brake pads and the plane of the pivots. The size of release springs also affects the required braking force. Such springs should be selected so that they will be strong enough to disengage the brake when the actuating mechanism is released, but not so strong that they interfere with swinging the brake pads against the rim 24. It will be apparent to those skilled in the art that the factors involved can be adjusted so that a brake assembly can be operated with a minimum of manual force being required.

Brake assembly 10 of the invention is designed to avoid locking of the brakes which could cause a rider to loose control of a bicycle. It is believed that a ratio of the distance between the center line of the brake pads and the plane of the pivots, to the perpendicular distance between the wheel rim and the pivots of at least one to one will substantially avoid locking of the brakes when using brake pads having a coefficient of friction of approximately 0.2. It has been found that a one to one ratio as set forth and a coefficient of friction of approximately 0.2 also provides a very efficient brake assembly.

Figure 6:
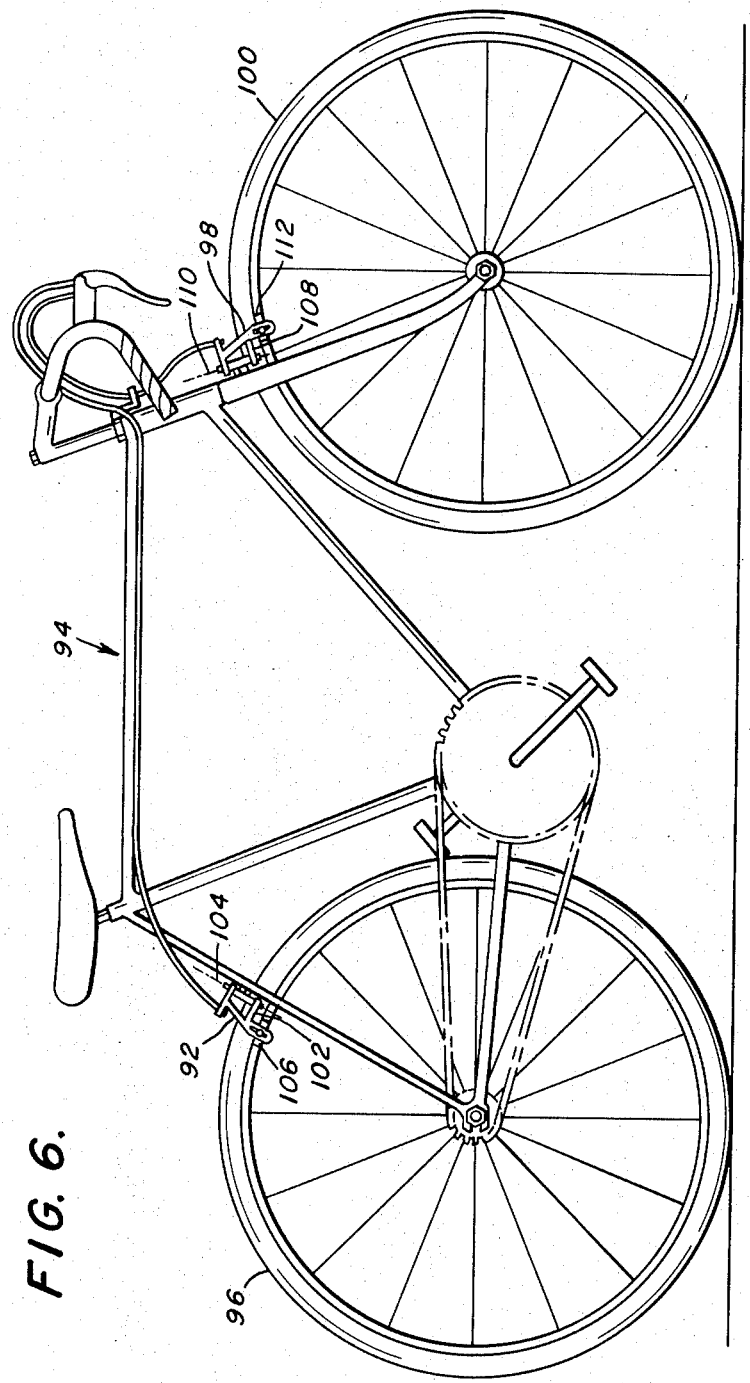
FIG. 6 is a side elevation view of a bicycle with brake assemblies of the invention mounted thereon.

Referring to FIG. 6, it is seen that according to this invention one brake assembly 92 which is self-energizing when a bicycle 94 moves in a forward direction can be mounted adjacent rear wheel 96 of the bicycle, and another identical brake assembly 98 which is self-de-energizing for such forward travel of the bicycle can be mounted adjacent front wheel 100 of the bicycle. Such an arrangement facilitates application of the larger braking force on the rear wheel rather than the front wheel of the bicycle using identical brake assemblies on both wheels, but reversing the mounting of the assemblies with respect to the direction of rotation of the wheels. Application of a greater braking force against the rear wheel is desirable because it results in controlled stopping of the bicycle with less chance of the rider being thrown over the handle bars of the bicycle. Rear brake assembly 92 is mounted on bicycle 94 with the arms 102 of the assembly extending from their pivot axes 104 rearward to brake pads 106. Consequently, when wheel 96 rotates clockwise as viewed in FIG. 6 the frictional force between the brake pads and the wheel rim creates a moment on the arms which increases the braking force between the brake pad and the wheel. Conversely, brake arms 108 on front brake assembly 98 extend from their pivot axes 110 forward to pads 112 in the direction of rotation of the wheel so that the friction force between the pad and the wheel pivots the pads away from the wheel and decreases the braking force therebetween. Two identical brake assemblies on bicycle 94 therefore provide a greater braking force on the rear wheel than is applied to the front wheel for the same manual force applied to both of the brakes.

Although a preferred embodiment of a brake assembly of the invention has been illustrated and described, it will be apparent to those skilled in the art that numerous modifications can be made therein without departing from the invention or the scope of the claims appended hereto. For example, an actuating mechanism for such brake assembly of the invention could have a center pull connection, as is well known in the art, to draw the lever arms together. The actuating could also be of a hydraulic type, which is also well known in the art. The brake arms, pivots and lever arms for such a brake assembly can also have many different shapes and connections for swinging the brake pads against a wheel rim in accordance with the invention. A brake assembly of the invention may also have the brake pads mounted on the actuating arms in such a manner that the pads can freely pivot with respect to the arms so that the pads will automatically align themselves with the surfaces of the rim of a bicycle wheel.

What is claimed is:

1. A brake assembly for a bicycle comprising a yoke and a pair of arms pivotably connected to the yoke on opposite sides of the rim of a wheel on the bicycle at a pair of pivot axes, one of which is spaced laterally on either side a distance outwardly from the rim and which extend substantially radially with respect to the wheel, said yoke supporting each of said arms at its pivot axis along a portion of the radial extent of the arm to substantially prevent deflection or rotation of the arm other than about its pivot axis, and each of said arms having a brake pad secured on the end thereof adjacent the wheel rim for rotation of the pad about the pivot axis for such arm, and with a line drawn between the rim at the area of contact with each of said pads and the axis for the arm on which such pad is mounted forming an acute angle with respect to the wheel, spring means for holding said pads normally spaced from the rim, and actuating means for swinging said arms and the pads thereon about their pivot axes in a plane which is substantially perpendicular to the pivot axes for movement of said brake pads toward the rim of the wheel whereby frictional force between said pads and the rim will create a moment on said arms about their respective pivot axes to either increase or decrease the brake force depending on the direction of rotation of the wheel.

2. A brake assembly as set forth in claim 1 in which said acute angle is approximately 45°.

3. A brake assembly as set forth in claim 1 in which said yoke supports each of said arms at its pivot axis for approximately one-quarter of the radial extent of the arm.

4. A brake assembly as set forth in claim 1 which includes means for synchronizing the swinging movement of said actuating arms.

5. A brake assembly as set forth in claim 1 in which each of said brake pads is wedge shaped.

6. A brake assembly as set forth in claim 1 which includes swivel means for adjusting the angle of each of said brake pads with respect to the surfaces of the rim of a bicycle wheel against which the pads are moved.

7. A brake assembly as set forth in claim 1 in which said actuating means comprises pull means extending across said arms adapted to pull the arms toward one another to move said brake pads against the rim of a bicycle wheel.

8. A bicycle having a brake assembly mounted thereon comprising a yoke, a pair of arms pivotably connected to the yoke on opposite sides of the rim of a wheel on the bicycle at a pair of pivot axes, one of which is spaced laterally on either side a distance outwardly from the rim and which extend substantially radially with respect to the wheel, said yoke supporting each of said arms at its pivot axis along a portion of the radial extent of the arm to substantially prevent deflection or rotation of the arm other than about its pivot axis, and each of said arms having a brake pad secured on the end thereof adjacent the wheel rim for rotation about the pivot axis for such arm and with a line drawn between the rim at the area of contact with each of said brake pads and the axis for the arm on which that pad is mounted forming an acute angle with respect to the wheel, spring means for holding said pads normally spaced from the rim, and actuating means for swinging said arms and the pads thereon about their pivot axes in a plane which is substantially perpendicular to the pivot axes for movement of said pads toward the rim of the wheel whereby frictional force between said pads and the rim will create a moment on said arms about their respective axes to either increase or decrease the braking force depending on the direction of rotataion of the wheel.

9. A brake assembly as set forth in claim 8 in which said acute angle is approximately 45°.

10. A bicycle as set forth in claim 8 in which a first brake assembly is mounted adjacent the rear wheel of the bicycle with the pivots located forward of brake pads respecting rotation of the wheel when the bicycle is traveling in a forward direction so the brake will be self-energizing, and a second brake assembly is mounted on the front wheel with the pivots rearward of the brake pads respecting such rotation of the wheel so the second brake will be self-de-energizing whereby for equal actuating forces applied to both brakes, the brake on the rear wheel will provide a greater braking force than will the brake on the front wheel.

11. A bicycle as set forth in claim 8 in which said brake assembly is mounted adjacent the rear wheel of the bicycle and said pivots are located advanced to said brake pads respecting the direction of rotation of said wheel when the bicycle is traveling a forward direction.

* * * * *